United States Patent
Tanaka

(10) Patent No.: US 9,248,804 B2
(45) Date of Patent: Feb. 2, 2016

(54) STEERING DEVICE

(75) Inventor: Takahiro Tanaka, Maebashi (JP)

(73) Assignee: NSK Ltd., Tokyo (JP)

( * ) Notice: Subject to any disclaimer, the term of this patent is extended or adjusted under 35 U.S.C. 154(b) by 154 days.

(21) Appl. No.: 13/376,969

(22) PCT Filed: Jul. 13, 2011

(86) PCT No.: PCT/JP2011/065942
§ 371 (c)(1),
(2), (4) Date: Apr. 9, 2013

(87) PCT Pub. No.: WO2012/023367
PCT Pub. Date: Feb. 23, 2012

(65) Prior Publication Data
US 2013/0186153 A1    Jul. 25, 2013

(30) Foreign Application Priority Data

Aug. 20, 2010  (JP) ................................. 2010-184974

(51) Int. Cl.
*B60R 25/02* (2013.01)
*B60R 25/021* (2013.01)
*B62D 1/184* (2006.01)

(52) U.S. Cl.
CPC ....... *B60R 25/02115* (2013.01); *B60R 25/0211* (2013.01); *B62D 1/184* (2013.01); *Y10T 70/5668* (2015.04)

(58) Field of Classification Search
USPC .......................................... 70/181–187, 252
See application file for complete search history.

(56) References Cited

U.S. PATENT DOCUMENTS

| | | | | |
|---|---|---|---|---|
| 7,310,979 B2* | 12/2007 | Hasegawa | | 70/186 |
| 7,316,138 B2* | 1/2008 | Goshima et al. | | 70/186 |
| 7,328,596 B2* | 2/2008 | Hasegawa et al. | | 70/186 |
| 7,703,309 B2* | 4/2010 | Okuno et al. | | 70/186 |
| 7,823,426 B2* | 11/2010 | Okuno et al. | | 70/186 |
| 8,596,160 B2* | 12/2013 | Nagamura et al. | | 74/492 |
| 8,904,901 B2* | 12/2014 | Mashimo et al. | | 280/775 |
| 2006/0021398 A1* | 2/2006 | Hasegawa et al. | | 70/186 |
| 2008/0105009 A1* | 5/2008 | Taniguchi et al. | | 70/186 |
| 2008/0178644 A1* | 7/2008 | Okuno et al. | | 70/187 |
| 2010/0212377 A1* | 8/2010 | Graglia | | 70/183 |
| 2010/0242665 A1* | 9/2010 | Nagamura et al. | | 70/184 |
| 2012/0096907 A1* | 4/2012 | Fenayon et al. | | 70/186 |

FOREIGN PATENT DOCUMENTS

| | | |
|---|---|---|
| JP | 2002-337663 | 11/2002 |
| JP | 2004-237973 | 8/2004 |
| JP | 2009-137309 | 6/2009 |
| WO | WO 2006/011378 A1 | 2/2006 |

* cited by examiner

*Primary Examiner* — Christopher Boswell
(74) *Attorney, Agent, or Firm* — Crowell & Moring LLP

(57) ABSTRACT

In a steering device having a steering lock device and a telescopic clamp device, the strength of a column in a key-locked state and the force of telescopic clamping are secured. A flange section and ribs are formed between a through hole which a lock pin comes in and leaves and a slit for reducing the inner circumferential diameter of an outer column so as to increase the strength of the outer column. Hence, both the strength of the outer column against the bending moment applied to the lock pin in a key-locked state and the strength of the outer column against telescopic clamping effected by reducing the inner peripheral diameter of the outer column can be secured.

3 Claims, 15 Drawing Sheets

STEERING DEVICE

TECHNICAL FIELD

The present invention relates to a steering device, particularly to a steering device having a steering lock device for locking, when an ignition key is turned into a lock position and pulled out from the key hole, the steering wheel making it, for theft prevention, unrotatable.

BACKGROUND ART

In a steering device having a steering lock device, when an ignition key is turned into a lock position and pulled out from the key hole, a lock pin projects toward the axis of the steering shaft. As a result, an end portion of the lock pin engages a key lock hole formed in a key lock collar press-fitted to the outer periphery of the steering shaft so as to fix the steering shaft to the outer column not to allow the steering shaft to rotate.

Existing steering devices having a steering lock device have a separate housing for the steering lock device bolted to a flange section of an outer column after the housing is positioned by fitting an engaging convex part of the housing in a through hole formed in the outer column.

There have also been steering devices having a steering lock device in which an outer column has a slit used to contract the diameter of the outer column so as to telescopically clamp the outer column to an inner column.

In cases where, in a steering device having both a steering lock device and a telescopic clamp device as described above, a through hole and a slit are closely positioned on an outer column, the outer column strength reduces. Therefore, when, in such cases, the steering wheel is subjected to a large rotating torque in a key-locked state (a lock pin is engaged with a key lock hole), the bending moment applied to the lock pin causes a large stress to be applied to the outer column possibly causing the outer column to be cracked.

In the steering device disclosed in Japanese Unexamined Patent Application Publication No. 2002-337663, a flange section made of thick steel plate is welded to a column made of a steel pipe enhancing the mounting rigidity between the column and the housing for a steering lock device. Also, in the steering device, an engaging convex part of the steering lock device is tightly fitted in a through hole formed in the column, and the bending moment applied to the lock pin in a key-locked state is born by both the flange section and the through hole. The column used in the steering device disclosed in Japanese Unexamined Patent Application Publication No. 2002-337663, is, however, made of steel, and no measure for enhancing the strength of a column made of an aluminum alloy and having both a through hole and a slit is disclosed.

In the steering device disclosed in International Publication WO2006/011378, to secure the strength of a portion peripheral to a slit formed in a column which is made of an aluminum alloy and which has both a through hole and the slot, a rib is formed along the peripheral edge of the closed end of the slit. International Publication WO2006/011378, however, includes no description of a flange section used to attach a housing for a steering lock device to the column.

SUMMARY OF INVENTION

Technical Problem

An object of the present invention is to provide a steering device having a steering lock device and a telescopic clamp device, wherein the strength of a column in a key-locked state and the force of telescopic clamping are secured.

Solution to Problem

The above object is achieved as follows. Namely, a steering device according to a first aspect of the invention comprises: an inner column; a hollow cylindrical outer column fitted, axially relatively movably, over the inner column; a steering shaft which is axially rotatably supported by the outer column and which can be attached with a steering wheel at a portion thereof toward a vehicle rear side; a steering lock device which is attached to the outer column and which causes a lock pin operated by operation of an ignition key to engage the steering shaft so as to lock the steering shaft not to allow the steering shaft to rotate; a slit formed to extend over a predetermined length along an axial direction of the outer column; a clamp device which can axially relatively immovably clamp the inner column by contracting a diameter of the outer column; a through hole formed in the outer column such that the through hole is circumferentially spaced, about an axis of the outer column, from the slit and such that there is a clearance formed between the through hole and an outer peripheral surface of the lock pin; and a flange section which is formed integrally with an outer peripheral surface portion between the slit and the through hole on the outer column, which projects radially outwardly from the outer peripheral surface portion and to which a housing to accommodate the steering lock device is attached.

According to a second aspect of the invention, in the steering device according to the first aspect of the invention, the flange section includes a rib formed to connect the flange section and the outer peripheral surface of the outer column so as to reinforce the flange section.

According to a third aspect of the invention, in the steering device according to the second aspect of the invention, the rib extends to near a closed end of the slit so as to reinforce a neighborhood portion of the closed end of the slit.

According to a fourth aspect of the invention, in the steering device according to the second aspect of the invention, the outer column includes a thin part formed, near the closed end of the slit, on the outer peripheral surface thereof so as to allow the diameter thereof to be contracted easily.

According to a fifth aspect of the invention, in the steering device according to the first aspect of the invention, a bending moment applied to the lock pin when the lock pin is engaged with the steering shaft is born only by the flange section.

According to a sixth aspect of the invention, in the steering device according to the second aspect of the invention, a bending moment applied to the lock pin when the lock pin is engaged with the steering shaft is born only by the flange section.

According to a seventh aspect of the invention, in the steering device according to the third aspect of the invention, a bending moment applied to the lock pin when the lock pin is engaged with the steering shaft is born only by the flange section.

According to an eighth aspect of the invention, in the steering device according to the fourth aspect of the invention, a bending moment applied to the lock pin when the lock pin is engaged with the steering shaft is born only by the flange section.

According to a ninth aspect of the invention, in the steering device according to one of the first to eighth aspects of the invention, the outer column is formed of an aluminum alloy or a magnesium alloy.

Advantageous Effects of Invention

The steering device according to the present invention comprises: a slit formed to extend over a predetermined length along an axial direction of the outer column; a clamp device which can axially relatively immovably clamp the inner column by contracting a diameter of the outer column; a through hole formed in the outer column such that the through hole is circumferentially spaced, about an axis of the outer column, from the slit and such that there is a clearance formed between the through hole and an outer peripheral surface of the lock pin; and a flange section which is formed integrally with an outer peripheral surface portion between the slit and the through hole on the outer column, which projects radially outwardly from the outer peripheral surface portion and to which a housing to accommodate the steering lock device is attached.

Hence, both the strength of the outer column against the bending moment applied to the lock pin in a key-locked state and the strength of the outer column against telescopic clamping effected by reducing the inner peripheral diameter of the outer column can be secured.

DESCRIPTION OF EMBODIMENTS

Figure 1:
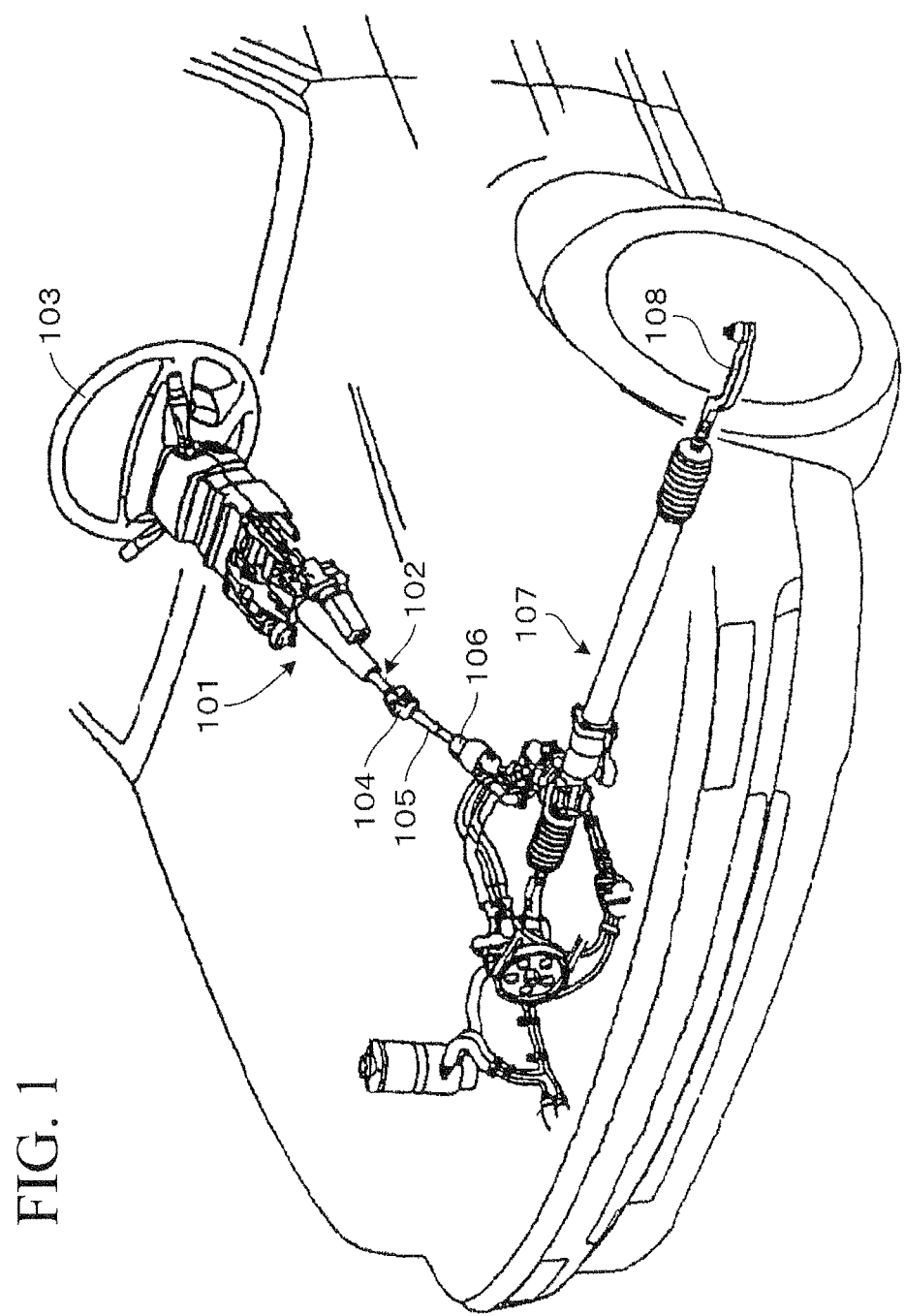
FIG. 1 is an overall perspective view of a steering device 101 installed in a vehicle according to an embodiment of the present invention.

FIG. 1 is an overall perspective view of a steering device 101 installed in a vehicle according to an embodiment of the present invention. The steering device 101 axially rotatably supports a steering shaft 102. The steering shaft 102 is attached, at an upper end thereof (an end toward the vehicle rear), with a steering wheel 103 and connected, at a lower end thereof (an end toward the vehicle front), with an intermediate shaft 105 via a universal joint 104.

The intermediate shaft 105 is connected, at a lower end thereof, with a universal joint 106 which is connected with a steering gear 107 including a rack and pinion mechanism.

When a driver turns the steering wheel 103, the turning force is transmitted to the steering gear 107 via the steering shaft 102, universal joint 104, intermediate shaft 105, and the universal joint 106, thereby moving a tie rod 108 to change the steering angle of wheels.

Figure 2:
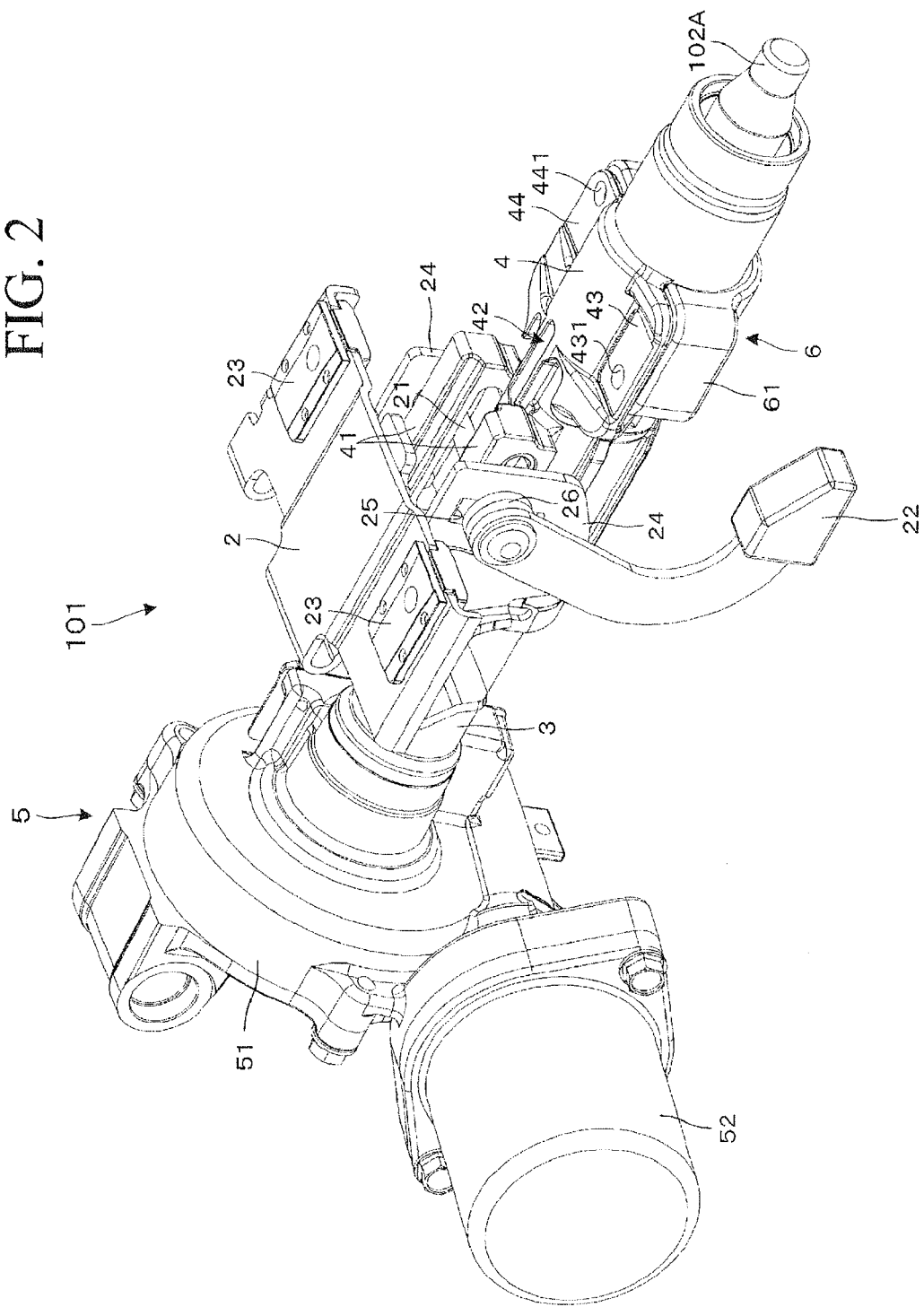
FIG. 2 is a perspective view, as seen from above on the left side toward the vehicle rear, of an essential part of the steering device 101 according to the present embodiment of the present invention.
Figure 3:
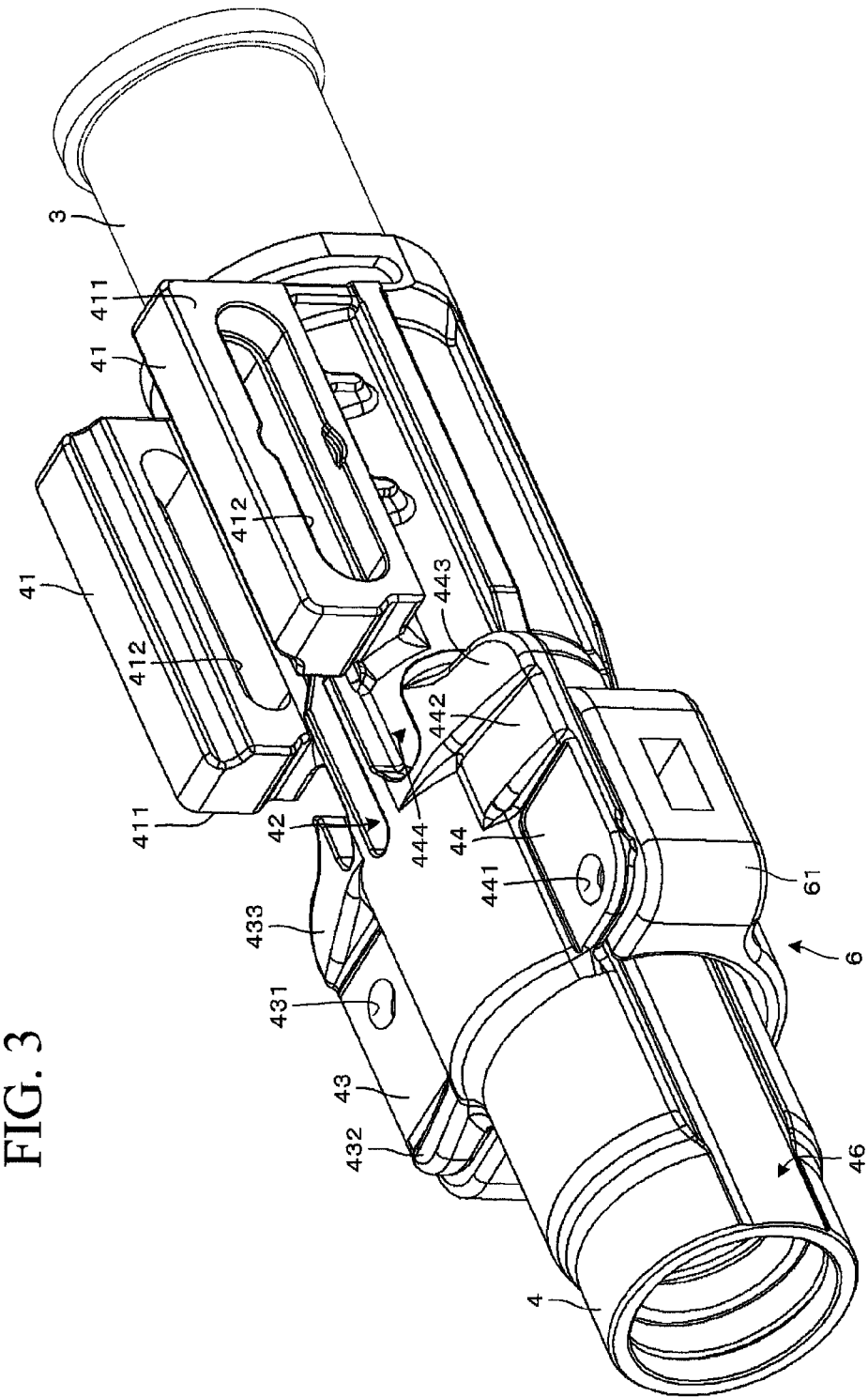
FIG. 3 is a perspective view, as seen from above on the right side toward the vehicle rear, of the steering device 101 of the present embodiment with a mounting bracket for mounting to the vehicle body removed.
Figure 4:
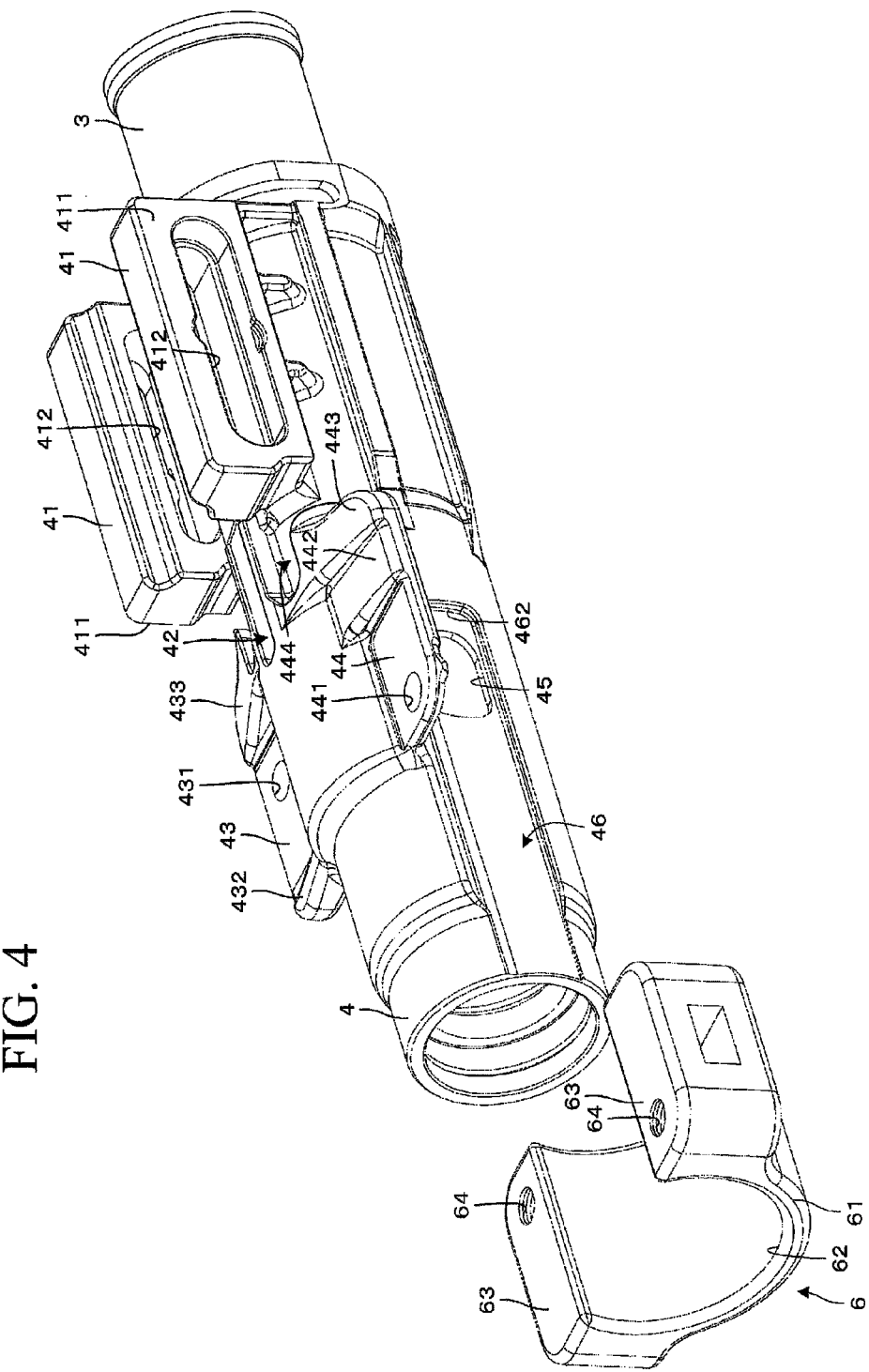
FIG. 4 is a perspective view, as seen from above on the right side toward the vehicle rear, of the steering device 101 in a state before a steering lock device is attached to the column assembly thereof.
Figure 5:
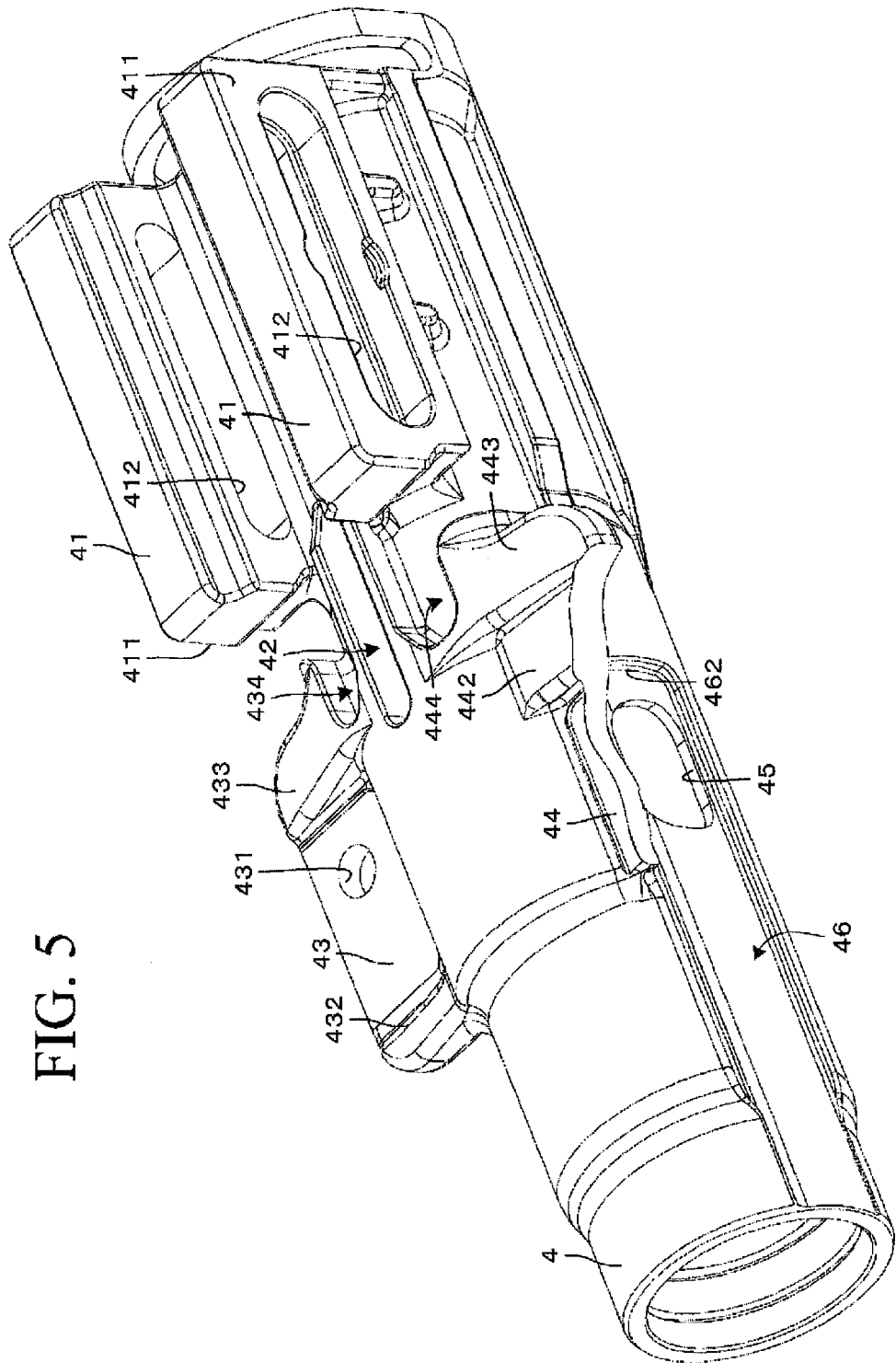
FIG. 5 is a perspective view, as seen from above on the right side toward the vehicle rear, of the column assembly alone shown in FIG. 4.

FIG. 2 is a perspective view, as seen from above on the left side toward the vehicle rear, of an essential part of the steering device 101 according to the present embodiment of the present invention. FIG. 3 is a perspective view, as seen from above on the right side toward the vehicle rear, of the steering device 101 of the present embodiment with a mounting bracket for mounting to the vehicle body removed. FIG. 4 is a perspective view, as seen from above on the right side toward the vehicle rear, of the steering device 101 in a state before a steering lock device is attached to the column assembly thereof. FIG. 5 is a perspective view, as seen from above on the right side toward the vehicle rear, of the column assembly alone shown in FIG. 4.

Figure 6:
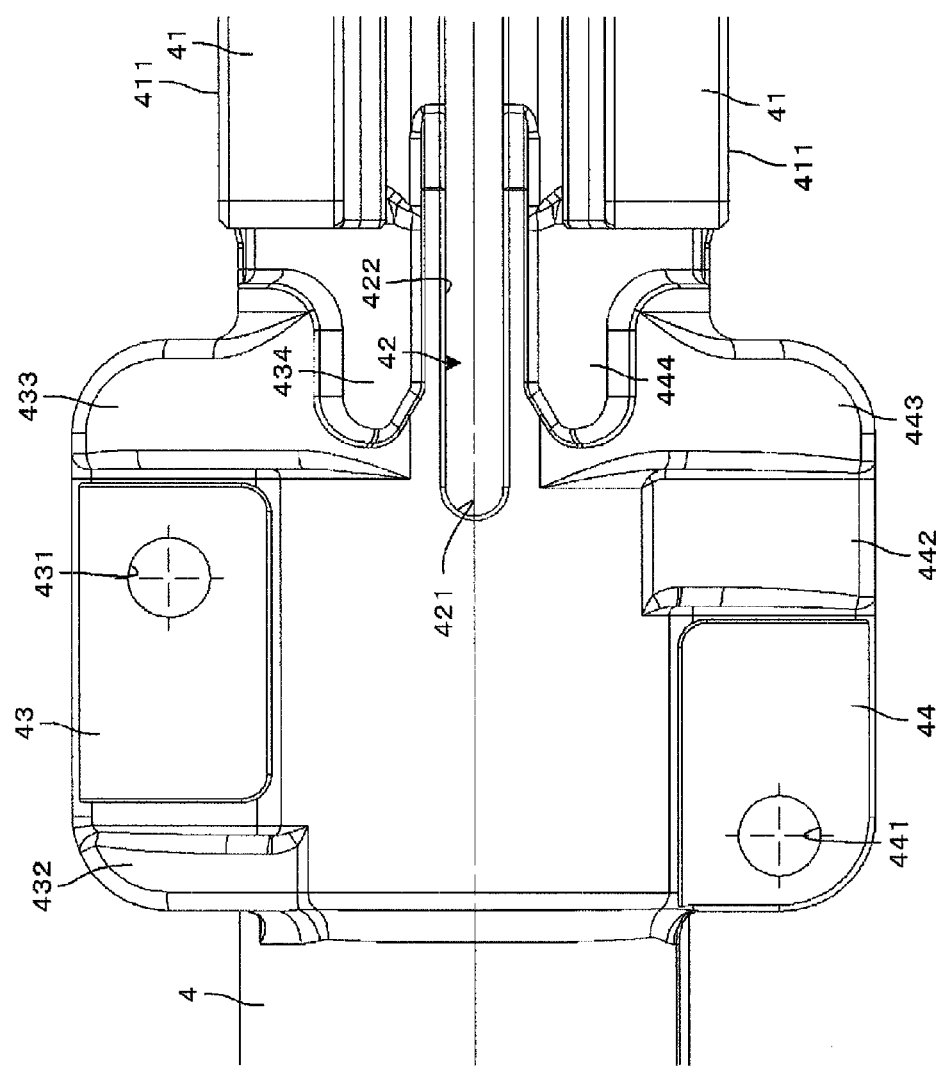
FIG. 6 is en enlarged plan view of a portion around the flange sections of the column assembly.
Figure 7:
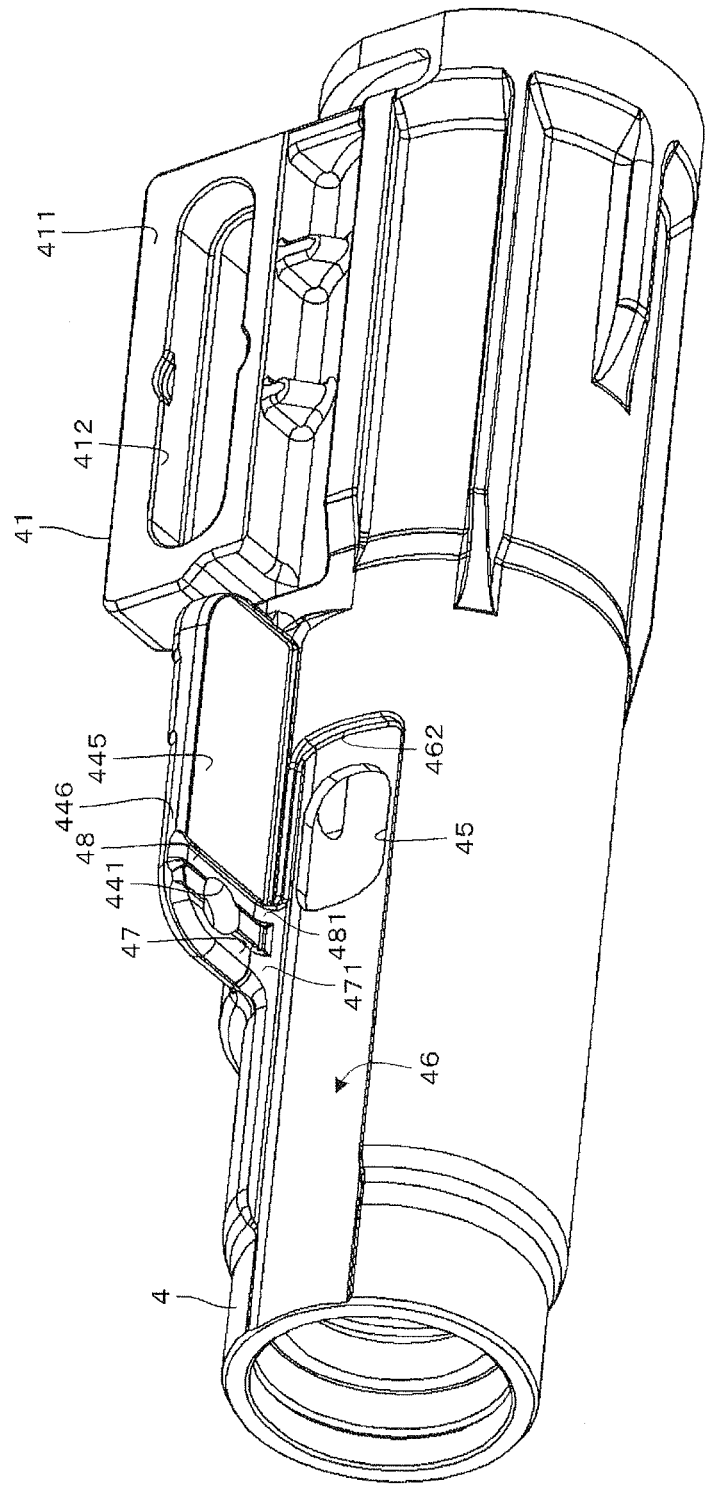
FIG. 7 is a perspective view, as seen from below on the right side toward the vehicle rear, of the column assembly shown in FIG. 4.
Figure 8:
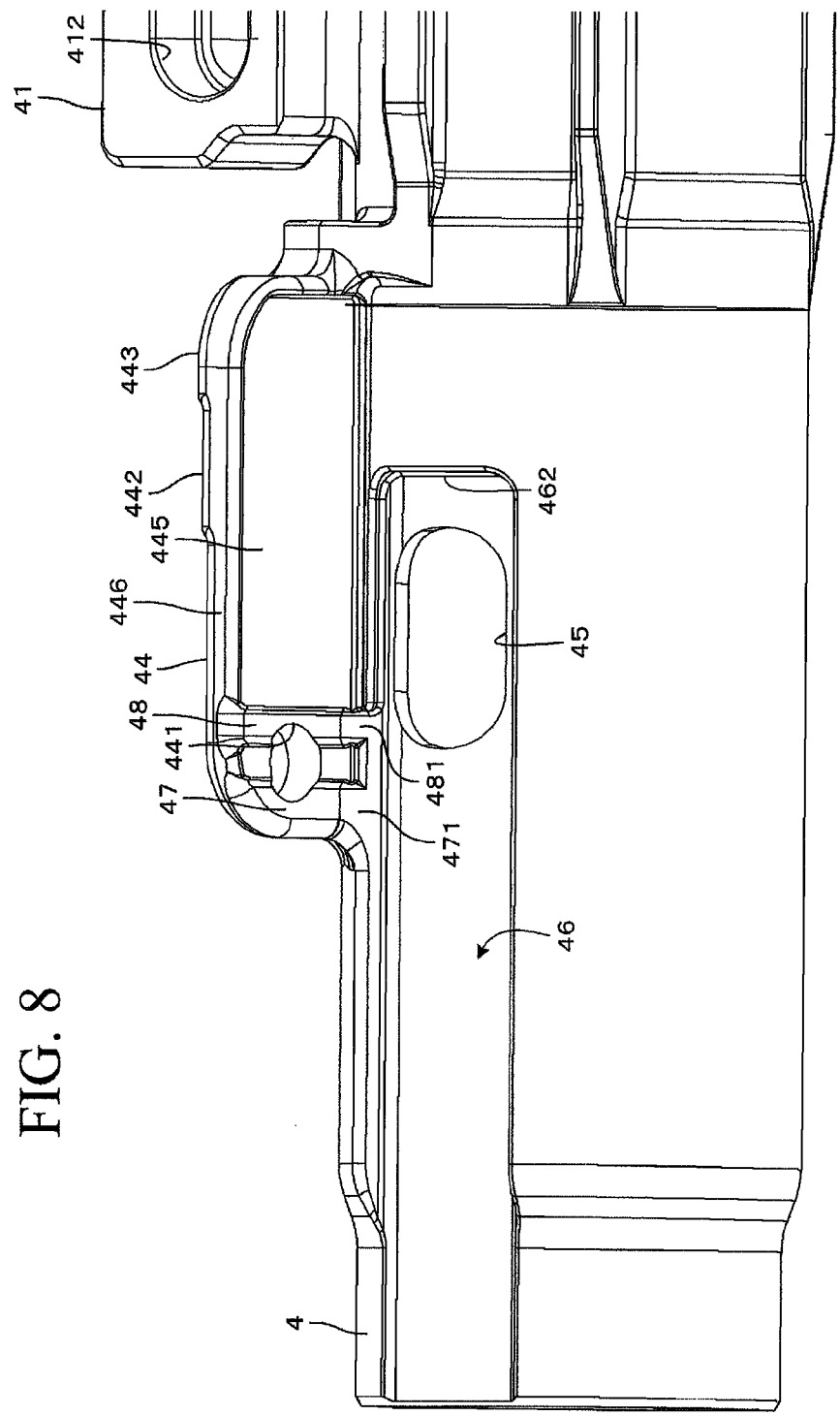
FIG. 8 is an enlarged perspective view, as seen from below on the right side toward the vehicle rear, of a portion around the flange section shown in FIG. 7 of the column assembly.
Figure 9:
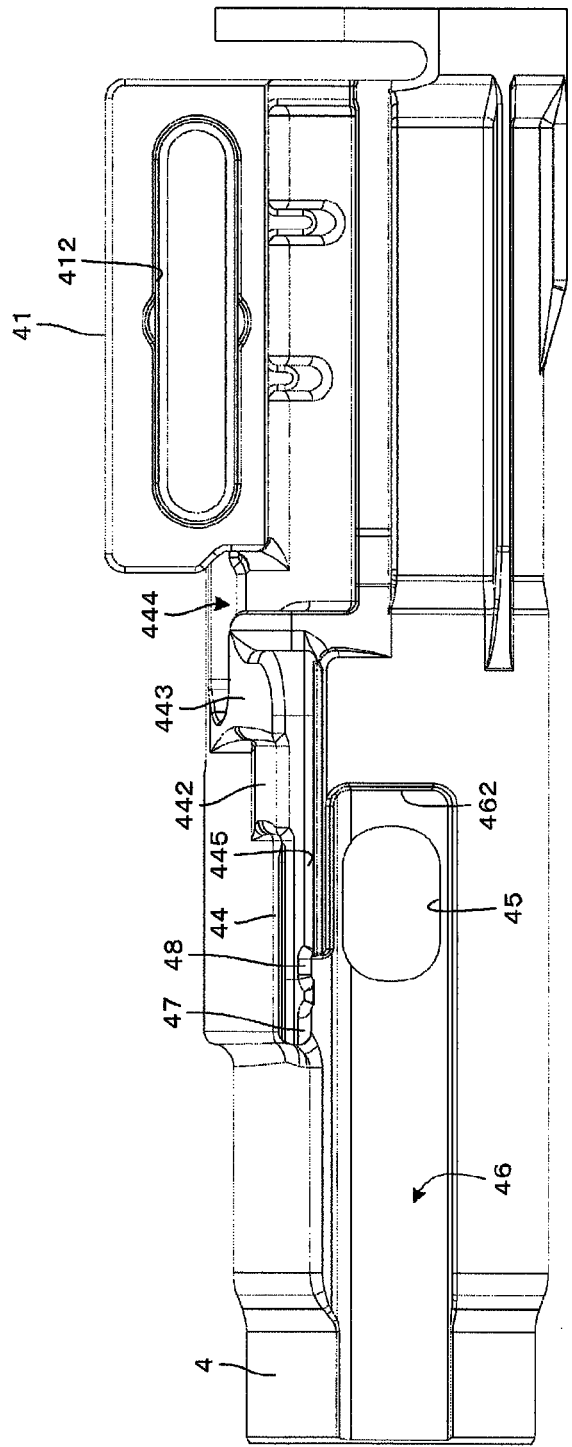
FIG. 9 is a front view, as seen from the right side in the vehicle width direction, of the column assembly shown in FIG. 4.
Figure 10:
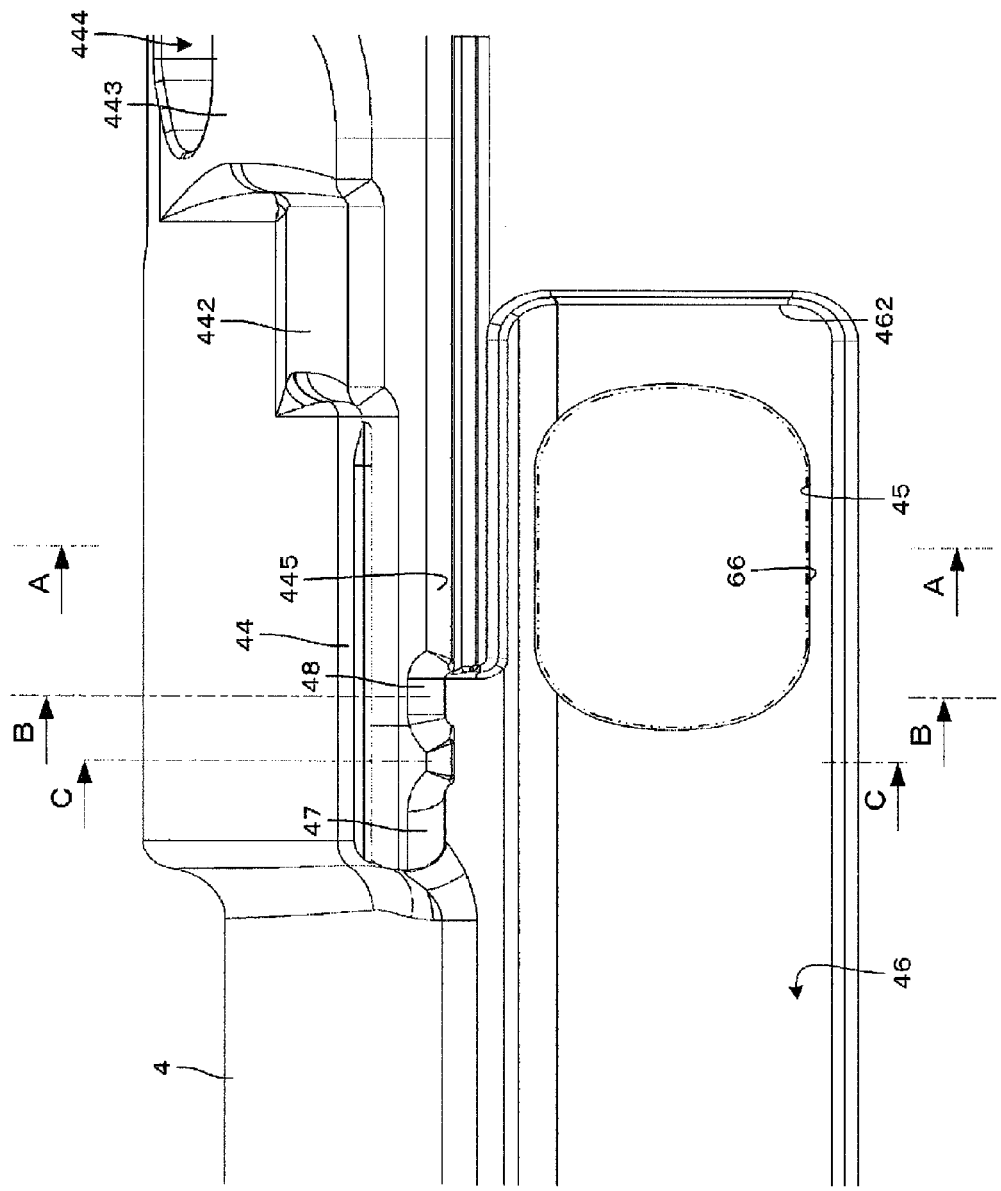
FIG. 10 is an enlarged front view, as seen from the right side in the vehicle width direction, of a portion around the flange section shown in FIG. 9 of the column assembly.

FIG. 6 is en enlarged plan view of a portion around the flange sections of the column assembly. FIG. 7 is a perspective view, as seen from below on the right side toward the vehicle rear, of the column assembly shown in FIG. 4. FIG. 8 is an enlarged perspective view, as seen from below on the right side toward the vehicle rear, of a portion around the flange section shown in FIG. 7 of the column assembly. FIG. 9 is a front view, as seen from the right side in the vehicle width direction, of the column assembly shown in FIG. 4. FIG. 10 is an enlarged front view, as seen from the right side in the vehicle width direction, of a portion around the flange section shown in FIG. 9 of the column assembly.

Figure 11:
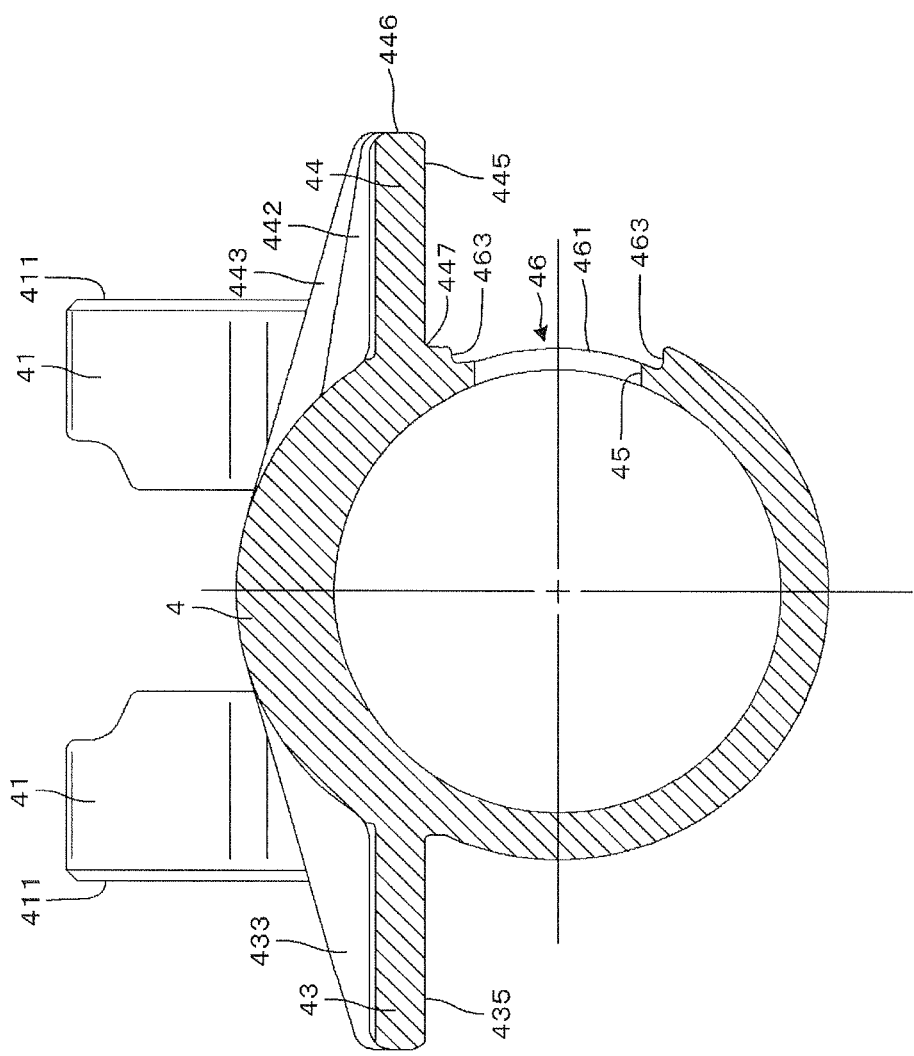
FIG. 11 is a cross-sectional view taken along line A-A in FIG. 10.
Figure 12:
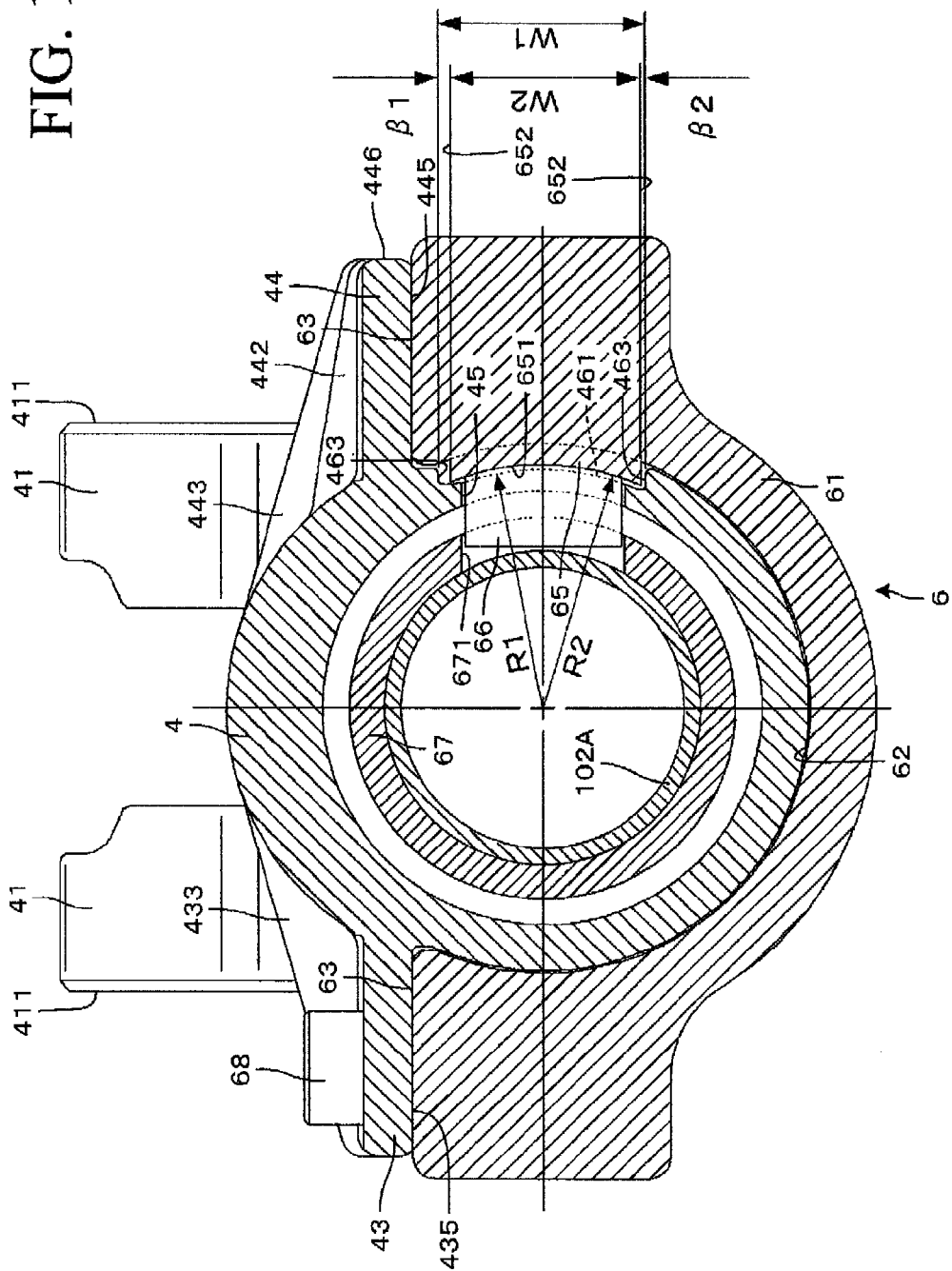
FIG. 12 is a cross-sectional view, including the steering lock device attached to the column assembly, taken along line A-A in FIG. 10.
Figure 13:
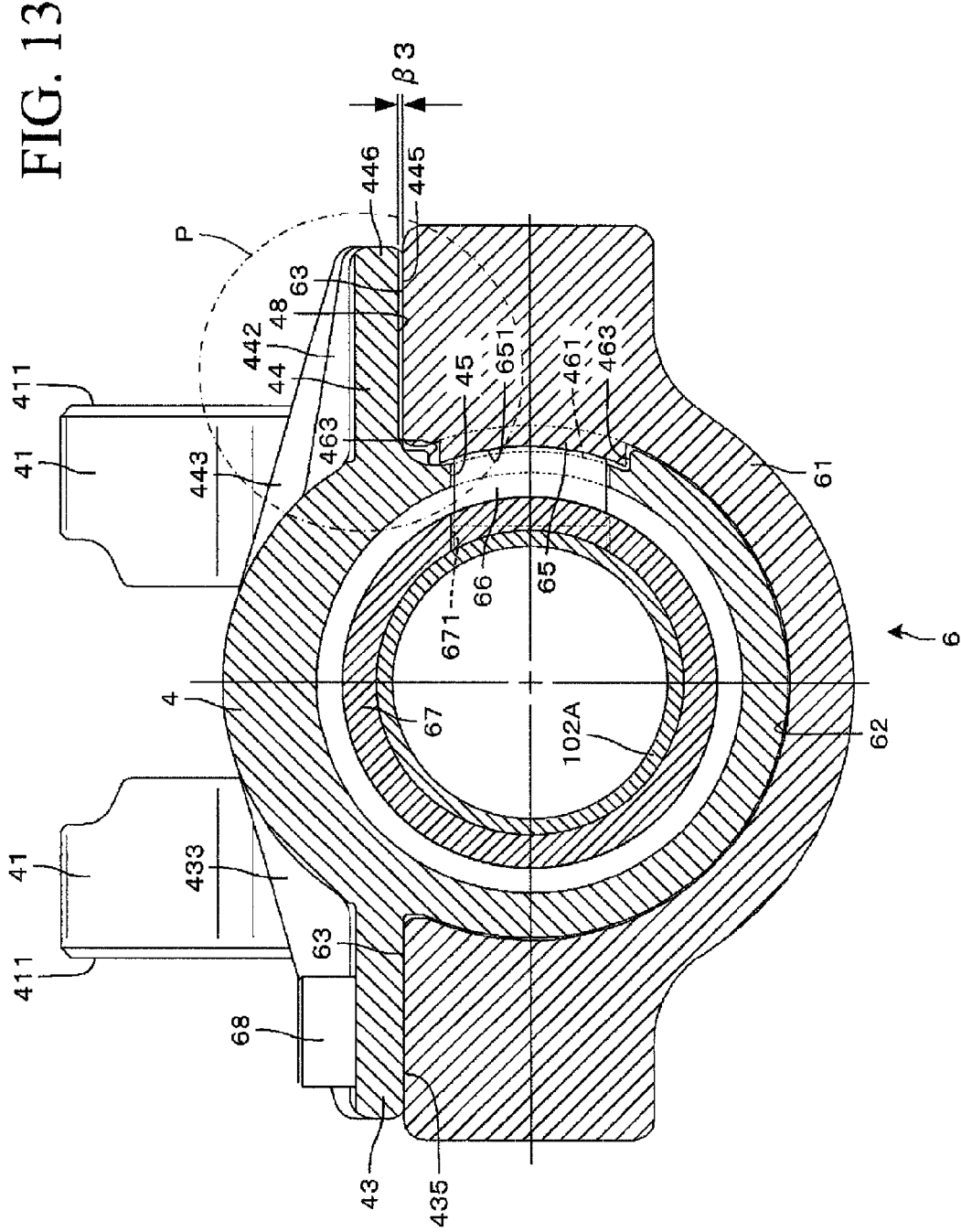
FIG. 13 is a cross-sectional view, including the steering lock device attached to the column assembly, taken along line B-B in FIG. 10.
Figure 14:
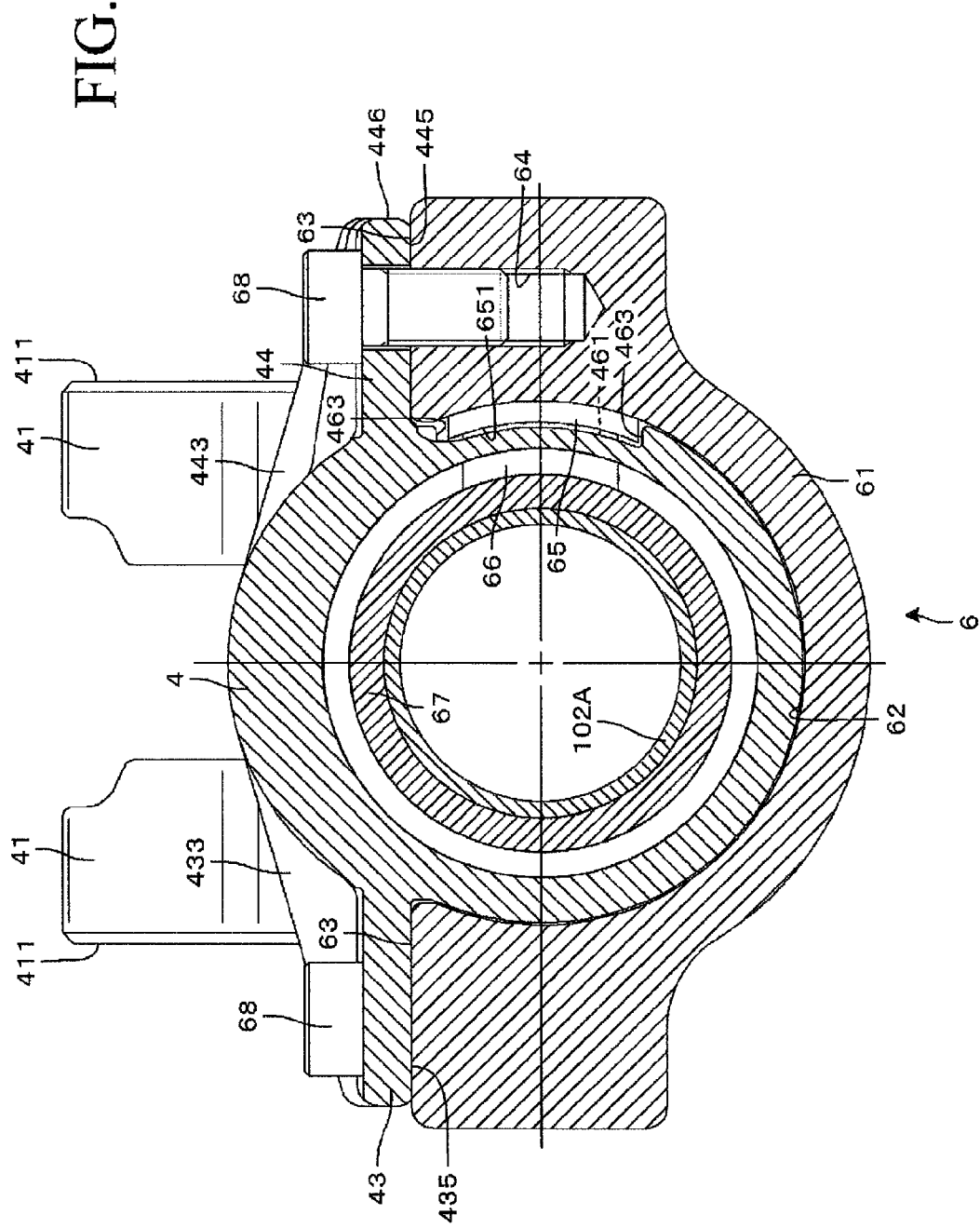
FIG. 14 is a cross-sectional view, including the steering lock device attached to the column assembly, taken along line C-C in FIG. 10.
Figure 15:
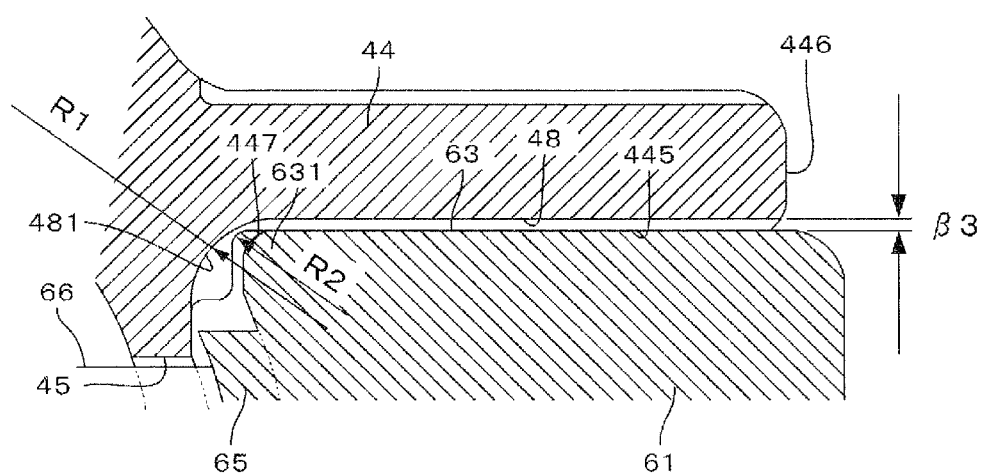
FIG. 15 is an enlarged cross-sectional view of portion P shown in FIG. 13.

FIG. 11 is a cross-sectional view taken along line A-A in FIG. 10. FIG. 12 is a cross-sectional view, including the steering lock device attached to the column assembly, taken along line A-A in FIG. 10. FIG. 13 is a cross-sectional view, including the steering lock device attached to the column assembly, taken along line B-B in FIG. 10. FIG. 14 is a cross-sectional view, including the steering lock device attached to the column assembly, taken along line C-C in FIG. 10. FIG. 15 is an enlarged cross-sectional view of portion P shown in FIG. 13.

As shown in FIG. 2, the steering device 101 of the present embodiment of the present invention includes a mounting bracket 2 for mounting to the vehicle body, an inner column (lower column) 3, and an outer column (upper column) 4. The mounting bracket 2 is fixed; via capsules 23, to the vehicle body, not shown.

The cylindrical inner column 3 is fitted, at an outer peripheral portion thereof toward the vehicle rear (toward the right side as seen in FIG. 2), with the inner peripheral surface of the hollow cylindrical outer column 4 such that the outer column 4 is telescopically movable (in parallel with the center axis of the inner column 3). The outer column 4 is made of a cast aluminum alloy formed, for example, by die casting. The outer column 4 axially rotatably supports an upper steering shaft 102A. An end portion toward the vehicle rear of the upper steering shaft 102A is fixed with the steering wheel 103 (see FIG. 1).

The inner column 3 is attached, at a portion thereof toward the vehicle front, with an assist device (steering assisting part) 5 for providing an auxiliary torque. The assist device 5 includes a gear housing 51 to which an electric motor 52 is fixed. A worm wheel inside the gear housing 51 engages a worm coupled to the rotary shaft, not shown, of the electric motor 52.

The direction and magnitude of the torque applied from the steering wheel 103 to the upper steering shaft 102A is detected by a torque sensor. The electric motor 52 is driven according to the torque direction and magnitude detected by the torque sensor so as to generate, via a deceleration mechanism including a worm and a worm wheel, an auxiliary torque of a proper direction and magnitude.

An end portion toward the vehicle front of the gear housing 51 is supported by the vehicle body such that its tilt is adjustable based on a tilt axis, not shown, serving as a tilt supporting axis. The outer column 4 is provided, in an upper portion thereof toward the vehicle top, with clamp members 41 formed to project toward the vehicle top on both the left and right sides in the vehicle width direction. As shown in FIGS. 2 to 15, outer sides 411 of the clamp members 41 are held, to be slidingly tiltable and telescopically slidable, between left and right side plates 24 of the mounting bracket 2.

The clamp members 41 each have a long telescopic adjustment slot 412 extending in the axial direction of the outer column 4. The left and right side plates 24 of the mounting brackets 2 each have a long tilt adjusting slot 25 extending in the vehicle height direction. A round clamping rod 21 is inserted through the long tilt adjusting slots 25 and long telescopic adjustment slots 412.

When an operation lever 22 attached to an end portion of the clamping rod 21 is swung, a cam lock mechanism 26 is actuated to cause the left and right side plates 24 of the mounting bracket 2 to be clamped. As a result, the left and right clamp members 41 attached to the outer column 4 are strongly clamped by the left and right side plates 24 of the mounting bracket 2.

The outer column 4 has, on an upper side thereof toward the vehicle top, a slit 42 formed through the thickness between the outer periphery and inner periphery thereof. The slit 42 is a long slit extending, in the axial direction of the outer column 4, between the clamp members 41. When the left and right side plates 24 of the mounting bracket 2 are clamped, the width in the vehicle width direction of the slit 42 is reduced causing the inner peripheral diameter of the outer column 4 to contract to strongly clamp the outer periphery of the inner column 3. This allows the outer column 4 to be clamped by the mounting bracket 2 at a desired tilt and telescopic position.

The hollow cylindrical outer column 4 has a pair of flange sections 43 and 44 formed integrally therewith on the left and right sides, in the vehicle width direction, toward the vehicle rear. The flange sections 43 and 44 are correspondingly positioned on the outer periphery of the outer column 4 and project radially outwardly, respectively. The flange sections 43 and 44 have bolt holes 431 and 441, respectively. As shown in FIGS. 3 and 6, the bolt hole 431 is formed in a portion near the end toward the vehicle front (rightward as seen in FIGS. 3 and 6) of the left flange section 43 as seen from the vehicle rear side, and the bolt hole 441 is formed in a portion near the end toward the vehicle rear (leftward as seen in FIGS. 3 and 6) of the right flange section 44 as seen from the vehicle rear side.

Also, as shown in FIGS. 3 and 6, the left flange section 43 is provided with flange-like ribs 432 and 433 formed integrally therewith. The ribs 432 and 433 reinforce the flange section 43 by connecting the flange section 43 to the outer periphery of the outer column 4. The rib 432 is formed on a side toward the vehicle rear (leftward as seen in FIGS. 3 and 6) of the left flange section 43, and the rib 433 is formed on a side toward the vehicle front (rightward as seen in FIGS. 3 and 6) of the left flange section 43. The right flange section 44 is provided with flange-like ribs 442 and 443 formed integrally therewith. The ribs 442 and 443 reinforce the flange section 44 by connecting the flange section 44 to the outer periphery of the outer column 4. The rib 442 is formed on a side toward the vehicle front (rightward as seen in FIGS. 3 and 6) of the right flange section 44, and the rib 443 is formed, integrally with the rib 442, on a side toward the vehicle front of the rib 442.

The ribs 432, 433, 442 and 443 are formed such that their thickness in a direction perpendicular to the axial direction of the outer column 4 increases toward the center axis of the outer column 4. The ribs 433 and 443 closer to the vehicle front than the ribs 432 and 442, respectively, extend longer toward the center axis of the outer column 4 than the ribs 432 and 442. Namely, the ribs 433 and 443 each extend to a vicinity of a closed end 421 toward the vehicle rear of the slit 42 thereby reinforcing the strength of the closed end 421 of the slit 42 where stress concentrates when the outer column 4 is telescopically clamped.

The outer column 4 is also provided with thin parts 434 and 444 formed on the outer periphery thereof to be outside, in the vehicle width direction, a parallel portion 422 of the slit 42 and close to where the parallel portion 422 and the closed end 421 meet. The thin parts 434 and 444 allow the slit width of the parallel portion 422 to be reduced by a small force when the outer column 4 is telescopically clamped. Namely, they make it easier to strongly clamp the outer periphery of the inner column 3 so as to intensify telescopic clamping.

As shown in FIGS. 4 and 11 to 15, a housing 61 of the steering lock device 6 is attached to mounting surfaces 435 and 445 provided on an underside of the flange section 43 and ribs 432 and 433 and on an underside of the flange section 44 and ribs 442 and 443, respectively. The mounting surfaces 435 and 445 extend in parallel along the axial direction of the outer column 4. The housing 61 is made of an aluminum alloy and has, on an upper side thereof, a circular concave surface 62. Flat clamping surfaces 63 are formed at both ends in the vehicle width direction of the circular concave surface 62. The clamping surfaces 63 have female threads 64 formed therein to correspond, respectively, to the bolt holes 431 and 441 formed in the flange sections 43 and 44.

When an ignition key, not shown, is tuned into a lock position and pulled out from the key hole, an elliptical lock pin 66 projects from an elliptical engaging convex part 65 formed on a right side of the circular concave surface 62. The engaging convex part 65 is formed to project from the circular concave surface 62 toward the outer periphery of the outer column 4. The upper steering shaft 102A is fitted with a key lock collar 67 press-fitted to the outer periphery thereof. A leading end portion of the lock pin 66 projected from the engaging convex part 65 engages a key lock hole 671 formed in the key lock collar 67 thereby locking the steering wheel 103 not to allow it to rotate.

The outer column 4 has an elliptical through hole 45 formed in a right side thereof. The elliptical through hole 45 is sized such that, when the lock pin 66 is inserted therein, a slight gap is formed between the through hole 45 and the outer periphery of the lock pin 66. The through hole 45 is formed to be circumferentially spaced 90 degrees from the slit 42 of the outer column 4. The outer column 4 also has a bottomed guide groove 46 formed on a right side thereof. The guide groove 46 extends, in the axial direction of the outer column 4, from near the elliptical through hole 45 to the end toward the vehicle rear (the left end as seen in FIG. 4) of the outer column 4. The width (groove width) W1 in the vehicle height direction of the guide groove 46 (see FIG. 12) is slightly larger than the width W2 in the vehicle height direction of the engaging convex part 65 of the steering lock device 6.

The guide groove 46 has a closed end 462 (see FIG. 4) closer to the vehicle front than the elliptical through hole 45 and is open ended at the end toward the vehicle rear of the outer column 4. The engaging convex part 65 has a circular concave surface (to oppose a bottom surface 461 of the guide groove 46) 651 formed on a leading end portion thereof. The outer diameter R1 (see FIG. 12) of the bottom surface 461 of the guide groove 46 is slightly smaller than the inner diameter R2 of the circular concave surface 651.

As shown in FIG. 4, the steering lock device 6 is assembled to the outer column 4 by inserting the engaging convex part 65 of the steering lock device 6 from the vehicle rear side into the guide groove 46, then sliding the steering lock device 6 along the guide groove 46 toward the vehicle front. As shown in FIG. 3, when the end toward the vehicle front of the engaging convex part 65 abuts against the closed end 462 of the guide groove 46, the female threads 64 formed in the housing 61 of the steering lock device 6 are positioned to correspond to the bolt holes 431 and 441 formed in the flange sections 43 and 44. At the same time, the lock pin 66 of the steering lock device 6 is positioned to correspond to the key lock hole 671 formed in the key lock collar 67.

In the above state, bolts 68 are screwed, through the bolt holes 431 and 441, in the female threads 64 and tightened to assemble the housing 61 to the outer column 4. This tightly fits the clamping surfaces 63 of the housing 61 of the steering lock device 6 to the mounting surface 435 on the underside of the flange section 43 and ribs 432 and 433 and to the mounting surface 445 on the underside of the flange section 44 and ribs 442 and 443.

At this time, as shown in FIG. 12, slight clearances β1 and β2 in the vehicle height direction are formed between side surfaces 463 of the guide groove 46 and side surfaces 652 (see FIG. 12) of the engaging convex part 65. A slight clearance is also formed between the outer periphery of the lock pin 66 and the through hole 45 in the outer column 4.

When, in a key-locked state (in a state where the lock pin 66 is engaged in the key lock hole 671), a large rotating torque is applied to the steering wheel 103, the lock pin 66 is subjected to a bending moment. Also, clamping the bolts 68 causes a clamping force toward the vehicle top to be applied to the housing 61 of the steering lock device 6.

Since, however, there is a slight clearance formed, in the vehicle height direction, between the outer periphery of the lock pin 66 and the through hole 45 and also between the guide groove 46 and the engaging convex part 65, the clamping force is born by the flange section 43 and ribs 432 and 433 and also by the flange section 44 and ribs 442 and 443 without any force applied to the through hole 45. The engaging convex part 65 is not fitted in the through hole 45, so that the through hole 45 is only required to be large enough to allow the lock pin 66 whose cross-sectional area is smaller than that of the engaging convex part 65 to come in and out. This makes it possible to reduce the cross-sectional area of the through hole 45 and thereby increase the strength of the outer column 4.

As shown in FIGS. 7, 8, 10, 13, and 15, the mounting surface 445 of the right flange section 44 has concave relief portions 47 and 48 formed near the bolt hole 441. The relief portions 47 and 48 are concave by β3 (see FIGS. 13 and 15) from the mounting surface 445. Of the two relief portions, the relief portion 47 is formed on the vehicle rear side (left side as seen in FIG. 8) of the bolt hole 441 and the relief portion 48 is formed on the vehicle front side (right side as seen in FIG. 8) of the bolt hole 441. The relief portions 47 and 48 are formed to extend from an outer side 446, in the vehicle width direction, of the flange section 44 to a base portion (where the flange section 44 and the outer periphery of the outer column 4 meet) of the flange section 44.

The relief portions 47 and 48 have round corners 471 and 481 formed where the relief portions 47 and 48 meet the outer periphery of the outer column 4, respectively. With the relief portions 47 and 48 concave by β3 from the mounting surface 445, radius R1 (see FIG. 15) of each of the round corners 471 and 481 of the relief portions 47 and 48 can be made larger than radius R2 of a round corner 447 of the mounting surface 445. This makes it possible to avoid interference between the relief portions 47 and 48 and the corner 631 at an inner end, in the vehicle width direction, of the right clamping surface 63 of the steering lock device 6.

When, in a key-locked state, a large rotating torque is applied to the steering wheel 103 causing a bending moment to be applied to the lock pin 66, a base portion near the bolt hole 441 of the flange section 44 is subjected to a large stress. The stress applied to the round corners 471 and 481 can, however, be reduced by allowing the round corners 471 and 481 to have a large radius R1.

The flange section 44 and ribs 442 and 443 are formed between the through hole 45 through which the lock pin 66 is moved in and out and the slit 42 for contracting the inner peripheral diameter of the outer column 4, so that strength of the outer column 4 is increased. Hence, both the strength of the outer column 4 against the bending moment applied to the lock pin 66 in a key-locked state and the strength of the outer column 4 against telescopic clamping effected by contracting the inner peripheral diameter of the outer column 4 can be secured.

Even though, in the above embodiment, the relief portions 47 and 48 are formed near the bolt hole 441 formed in the mounting surface 445 of the right flange section 44, such relief portions may be formed near the bolt hole 431 formed in the mounting surface 435 of the left flange section 43. Such relief portions may even be formed both near the bolt hole 441 and near the bolt hole 431. Furthermore, even though, in the above embodiment, the outer column is made of an aluminum alloy, it may be made of a magnesium alloy or a resin.

REFERENCE SIGNS LIST

101 Steering Device
102 Steering shaft
102A Upper steering shaft
103 Steering wheel
104 Universal joint
105 Intermediate shaft
106 Universal joint
107 Steering gear
108 Tie rod
2 Mounting bracket for mounting to vehicle body 21 Clamping rod
22 Operation lever
23 Capsule
24 Side plate
25 Long tilt adjusting slot
26 Cam lock mechanism
3 Inner column (lower column)
4 Outer column (upper column)
41 Clamp member
411 Outer side
412 Long telescopic adjustment slot
42 Slit
421 Closed end
422 Parallel portion
43 Flange section
431 Bolt hole
432, 433 Ribs
434 Thin part
435 Mounting surface
44 Flange section
441 Bolt hole
442, 443 Ribs
444 Thin part
445 Mounting surface
446 Outer side in vehicle width direction
447 Round corner
45 Through hole
46 Guide groove
461 Bottom surface
462 Closed end
463 Side surface
47, 48 Relief portions
471, 481 Round corners
5 Assist device (steering assisting part)
51 Gear housing
52 Electric motor
6 Steering lock device
61 Housing
62 Circular concave surface
63 Clamping surface
631 Corner
64 Female thread
65 Engaging convex portion
651 Circular concave surface
652 Side surface
66 Lock pin
67 Key lock collar
671 Key lock hole
68 Bolt

The invention claimed is:
1. A steering device comprising:
an inner column;
a hollow cylindrical outer column fitted, axially relatively movably, over the inner column for telescopic adjustment of the outer column;
a steering shaft which is axially rotatably supported by the outer column and which can be attached with a steering wheel at a portion thereof toward a vehicle rear side;
a steering lock device which is attached to the outer column and which causes a lock pin operated by operation of an ignition key to engage the steering shaft so as to lock the steering shaft not to allow the steering shaft to rotate;
a slit formed to extend over a predetermined length along an axial direction of the outer column for allowing a width of the slit to be reduced;
a clamp device having clamp members formed to project upwardly from the outer column at both of right and left sides of the slit, and for clamping the outer column to the inner column by diameter contraction of the outer column through the width reduction of the slit caused by compression of the clamp members;
a through hole formed in the outer column such that the through hole is circumferentially spaced, about an axis of the outer column, from the slit and such that there is a clearance formed between the through hole and an outer peripheral surface of the lock pin; and
a pair of flange sections which are formed integrally with an outer peripheral surface portion between the slit and the through hole on the outer column, the pair of flange sections projecting radially outwardly from the outer peripheral surface portion and to which a housing to accommodate the steering lock device is attached, wherein
the outer column includes thin parts formed, at both sides and near a closed end of the slit, on the outer peripheral surface of the outer column so as to allow the diameter of the outer column to be contracted easily, wherein
each of the flange sections includes a rib formed to connect the flange section and the outer peripheral surface of the outer column and extending to the closed end of the slit wherein
a bottomed guide groove is formed on the outer column extending from the rear end of the outer column to near and beyond the through hole, wherein
the housing of the steering lock device has a circular concave surface, a pair of flat clamping surfaces formed at both ends of the circular concave surface for attaching the housing to the flange sections, and an engaging convex part with clearance between the guide groove from which the lock pin projects and engages with a key lock hole of the steering shaft for locking the steering shaft, wherein
a bending moment applied to the lock pin when the lock pin is engaged with the steering shaft is born only by the pair of flange sections by providing clearances formed between the outer periphery of the lock pin and the through hole and between the guide groove and the engaging convex part.
2. The steering device according to claim 1, wherein the outer column is formed of an aluminum alloy or a magnesium alloy.
3. The steering device according to claim 1, wherein the steering lock device is assembled by inserting the engaging convex part into the guide groove from the rear side thereof and sliding the steering lock device along the guide groove toward the front.

* * * * *